(12) United States Patent
Ushida et al.

(10) Patent No.: US 9,020,312 B2
(45) Date of Patent: Apr. 28, 2015

(54) CONNECTING CHANNEL

(75) Inventors: Jun Ushida, Tokyo (JP); Junichi Fujikata, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 13/378,352

(22) PCT Filed: Apr. 14, 2010

(86) PCT No.: PCT/JP2010/056644
§ 371 (c)(1),
(2), (4) Date: Feb. 8, 2012

(87) PCT Pub. No.: WO2010/146926
PCT Pub. Date: Dec. 23, 2010

(65) Prior Publication Data
US 2012/0134633 A1    May 31, 2012

(30) Foreign Application Priority Data

Jun. 16, 2009   (JP) ................. 2009-143417

(51) Int. Cl.
G02B 6/42    (2006.01)
G02B 6/12    (2006.01)
G02B 6/122   (2006.01)
G02F 1/025   (2006.01)
G02F 1/225   (2006.01)

(52) U.S. Cl.
CPC ............ *G02B 6/12004* (2013.01); *G02B 6/122* (2013.01); G02B 2006/12097 (2013.01); G02B 2006/12195 (2013.01); *G02F 1/025* (2013.10); *G02F 1/2257* (2013.01); G02F 2201/063 (2013.01); G02F 2201/12 (2013.01); G02F 2202/104 (2013.01)

(58) Field of Classification Search
None
See application file for complete search history.

(56) References Cited

U.S. PATENT DOCUMENTS

| | | | |
|---|---|---|---|
| 7,251,406 B2* | 7/2007 | Luo et al. | 385/131 |
| 8,600,198 B2* | 12/2013 | Sudo et al. | 385/2 |
| 2004/0208454 A1 | 10/2004 | Montgomery et al. | |
| 2004/0223768 A1 | 11/2004 | Shastri et al. | |

(Continued)

FOREIGN PATENT DOCUMENTS

| | | |
|---|---|---|
| JP | 2006-515082 A | 5/2006 |
| JP | 2007-516466 A | 6/2007 |

(Continued)

OTHER PUBLICATIONS

Ansheng Liu, et al. "High-Speed Optical Modulation based on Carrier Depletion in a Silicon Waveguide," Optics Express No. 2, vol. 15 (2007) pp. 660-668.

*Primary Examiner* — Hemang Sanghavi
(74) *Attorney, Agent, or Firm* — McGinn IP Law Group, PLLC

(57) ABSTRACT

Provided is a connecting channel that has manufacturing tolerance, can suppress light loses, improves reliability of the connecting channel, and connects an optical device and an optical waveguide. The connecting channel includes first silicon layer (3) that has rib-shaped part (3') extending in a longitudinal direction of the connecting channel, and second silicon layer (6) that is stacked on first silicon layer (3) to partially overlap rib-shaped part 3', and extends in the longitudinal direction. Second silicon layer (6) has tapered part (W) tapered toward one end in the longitudinal direction, and is located away from an upper portion of rib-shaped part (3') at an end surface of one end in the longitudinal direction.

14 Claims, 7 Drawing Sheets

(56) References Cited

U.S. PATENT DOCUMENTS

| | | |
|---|---|---|
| 2005/0189591 A1 | 9/2005 | Gothoskar et al. |
| 2006/0140645 A1 | 6/2006 | Shastri et al. |
| 2006/0285797 A1* | 12/2006 | Little .......................... 385/43 |
| 2008/0137695 A1 | 6/2008 | Takahashi et al. |
| 2013/0051727 A1* | 2/2013 | Mizrahi et al. ................ 385/28 |

FOREIGN PATENT DOCUMENTS

| | | |
|---|---|---|
| JP | 2007-525711 A | 9/2007 |
| JP | 2008-147209 A | 6/2008 |

\* cited by examiner

Fig.3　　　　　　　　　PRIOR ART
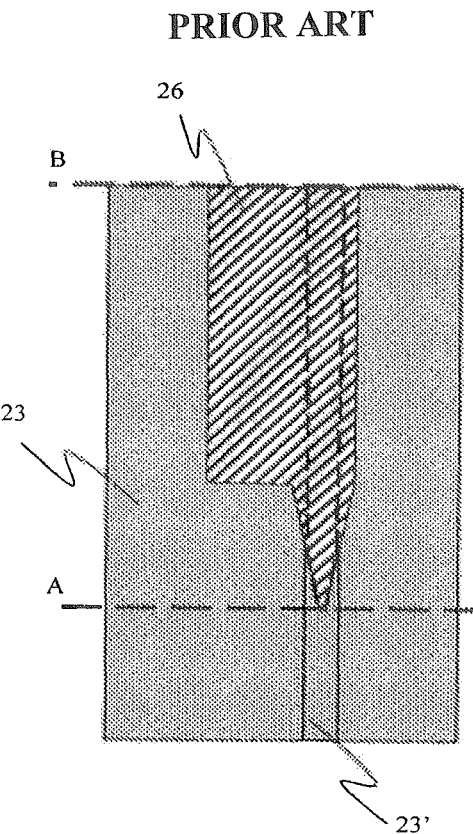
Fig.4A
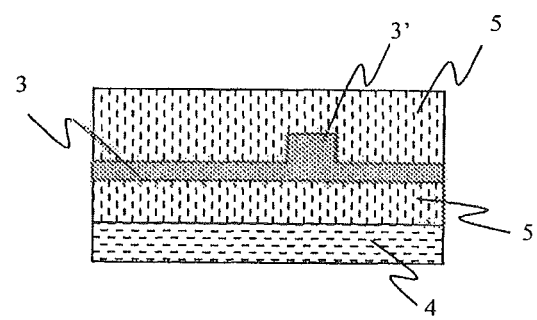
Fig.4B
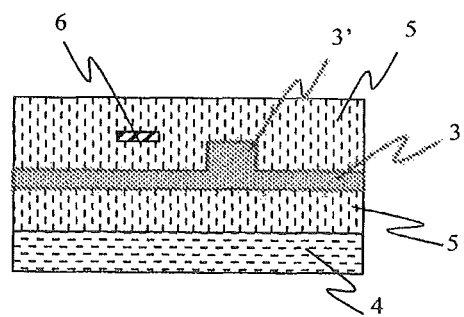

DIRECTION OF
PROPAGATION OF LIGHT

CONNECTING CHANNEL

TECHNICAL FIELD

The present invention relates to a connecting channel that connects an optical waveguide and an optical device.

BACKGROUND ART

An information communication network represented by the Internet has been set up worldwide as an infrastructure essential to our daily life. As a technology for supporting traffic of the information communication network, there is an optical communication technology that uses optical fibers. A silicon based optical communication device capable of using a band of 1.3 micrometers and a band of 1.5 micrometers in an optical fiber communication wavelength range is very promising in that using a CMOS (Complementary Metal Oxide Semiconductor) technology enables integration of optical functional elements and electronic circuits on a silicon platform.

As one of methods of dealing with yearly increasing traffic of the information communication network, there is a method of increasing the information transmission speed per channel. To achieve this, an optical modulator that is one among various optical devices for converting a signal from a LSI (Large Scale Integration) circuit responsible for signal processing in the optical communication device into an optical signal at a high speed is important. It is desired that such an optical modulator be realized on a silicon platform.

Representative among optical modulators presented thus far is a modulator that changes optical waveguide characteristics by using a carrier plasma effect to change the refractive index of a silicon material. For example, Nonpatent Literature 1 discusses an optical modulator that uses a p-n (positive-negative) junction that operates when a reverse bias voltage is applied. There is also an optical modulator that uses a MOS (Metal-Oxide-Semiconductor) capacitor. Both optical modulators can operate at high speeds.

FIG. 1 shows an example (refer to Nonpatent Literature 1) of a silicon based optical modulator according to a related art, which is one of optical devices and uses a waveguide formed on a SOI (Silicon on Insulator) substrate.

Oxide layer 25 and p-doped silicon layer 23 that has been doped are sequentially stacked on substrate 24 to form a SOI substrate. On an upper surface of p-doped silicon layer 23 formed into a rib shape, n-doped silicon layer 21 that has been formed into a reverse rib shape and that has been doped is deposited. On one side of n-doped silicon layer 21, n+ doped silicon layer 20 doped with a high concentration is located. On both sides of p-doped silicon layer 23, p+ doped silicon layers 22 doped with high concentrations are formed. Electrode 27 is connected to n+ doped silicon layer 20 and p+ doped silicon layer 22. Oxide layer 25 covers the entire optical modulator. Rib-shaped part 23' of p-doped silicon layer 23 and reverse rib-shaped part 21' of n-doped silicon layer 21 constitute a waveguide, and optical modulation is performed in the waveguide by applying a reverse bias voltage to electrode 27.

In the case of the optical modulator that includes the p-n junction or the MOS capacitor, when the optical modulator is connected to an optical waveguide disposed outside the optical modulator, the waveguide of the optical modulator and the waveguide of the optical waveguide are different in structure. Such a sudden shape change of the waveguide at a connection portion of both waveguides different in structure causes reflection of light, generating light coupling losses at the connection portion of the optical waveguide and the optical modulator. The coupling losses may reduce, in addition to an increase of insertion losses of light to the optical modulator, optical modulation efficiency of the optical modulator. This necessitates establishment of a connecting channel between the optical modulator and the optical waveguide to reduce coupling losses.

For example, as shown in FIG. 29 and FIG. 30 of Patent Literature 1, light losses are reduced at the connection portion of the optical waveguide and the optical modulator by forming a single sharp-pointed taper (one of input increase taper, output decrease taper, input decrease taper, and output increase taper) at each of an input part and an output part of each silicon (Si) layer stacked at two stages in an input/output part of the optical modulator.

CITATION LIST

Patent Literature

Patent Literature 1: PCT National Publication No. 2006-515082

Nonpatent Literature

Nonpatent Literature 1: A. Liu et al., OPTICS EXPRESS, vol. 25 No. 2 (2007), pp. 660 to 668.

SUMMARY OF INVENTION

Problems to be Solved

However, the connecting channel of the silicon (Si) layer staked at the two stages shown in FIG. 29 and FIG. 30 of Patent Literature 1 has a problem. Specifically, a certain broad width at a leading end of the taper of the Si layer formed in the connecting channel causes coupling losses. There is also a problem of an increase of coupling losses caused by positional shifting due to a manufacturing error between an upper Si and a lower Si in the connecting channel.

Referring to FIGS. 2A to 3, the problems are described more specifically.

FIGS. 2A to 3 schematically show the vicinity of the connecting channel when the optical waveguide and the connecting channel are connected in the example of the related art: FIG. 2A schematically showing a sectional view side end of the connecting channel of the optical waveguide at a position AA' shown in FIG. 3, FIG. 2B schematically showing a sectional view of the connecting channel at the position AA' shown in FIG. 3, and FIG. 3 showing a top view when the optical waveguide and the connecting channel are connected. The optical waveguide is connected below the position AA' shown in FIG. 3, and the optical waveguide that is one of the optical devices shown in FIG. 1 is connected above position BB'. However, an optical modulator is not shown. Oxide layer 25 is omitted.

As shown in FIG. 2A, the optical waveguide includes a SOI substrate, which includes substrate 24, oxide layer 25, and p-doped silicon layer 23 that has been doped, and p-doped silicon layer 23 has a rib-shaped part 23' that becomes a waveguide.

As shown in FIG. 2B, an optical waveguide side end of the connecting channel includes a SOI substrate as in the case of the waveguide shown in FIG. 2A, and has rib-shaped part 23' formed in p-doped silicon layer 23. Polycrystal silicon layer 26 is formed on an upper surface of rib-shaped silicon layer 23'.

As shown in FIG. 3, polycrystal silicon layer 26 has a tapered shape on rib-shaped part 23' including p-doped silicon layer 23, and a leading end of the taper of polycrystal silicon layer 26 is set at the position AA'.

As shown in FIG. 3, the leading end of the taper of polycrystal silicon layer 26 has a certain broad width. Theoretically, no light loss occurs when the leading end of the taper is peaked at an atomic level. In reality, however, there is a limit to thinning of the leading end of the taper. Thus, the shape of the waveguide suddenly changes by an amount equal to the width of the leading end of the taper. Light is reflected on this portion, causing light scattering losses.

When the upper Si layer (polycrystal silicon layer 26 in FIGS. 2A to 3) and the lower Si layer (rib-shaped part 23' of p-doped silicon layer in FIGS. 2A to 3) are formed, positional shifting occurs due to the manufacturing error. When a position of the leading end of the taper shifts vertically to a propagation direction of light, the leading end of the taper shifts from a center of the waveguide. Thus, a center position of a light field shifts, or the taper becomes asymmetrical left and right on the waveguide, setting the transmitted light in a mode different from a planned mode. As a result, light losses occur. The manufacturing error increases/decreases coupling losses. Thus, coupling losses vary from one connecting channel to another, creasing a reliability problem.

It is an object of the present invention to provide a connecting channel for connecting an optical device and an optical waveguide, which can solve the abovementioned problems of the related art, namely, low manufacturing tolerance of the connecting channel, easy light losses, and low reliability of the connecting channel.

Solution to Problems

A connecting channel according to the present invention includes a first silicon layer that has a rib-shaped part extending in a longitudinal direction of the connecting channel, and a second silicon layer that is stacked as an upper layer of the first silicon layer to partially overlap the rib-shaped part, and extends in the longitudinal direction. The second silicon layer has a tapered part tapered toward one end in the longitudinal direction, and is located away from an upper portion of the rib-shaped part at an end surface of one end in the longitudinal direction.

Effect of the Invention

According to the present invention, when an optical device and an optical waveguide are connected via the connecting channel, coupling losses can be reduced, and manufacturing tolerance and reliability of the connecting channel can be improved.

BRIEF DESCRIPTION OF DRAWINGS

FIG. 3 is a schematic top view showing the example of the connecting channel according to the related art.

FIG. 4A is a schematic sectional view showing a connecting channel side end of an optical waveguide at position AA' in an embodiment of the present invention shown in FIG. 5C.

FIG. 4B is a schematic sectional view showing an optical waveguide side end of the connecting channel at position AA' in the embodiment of the present invention shown in FIG. 5C.

DESCRIPTION OF EMBODIMENTS

Figure 1:
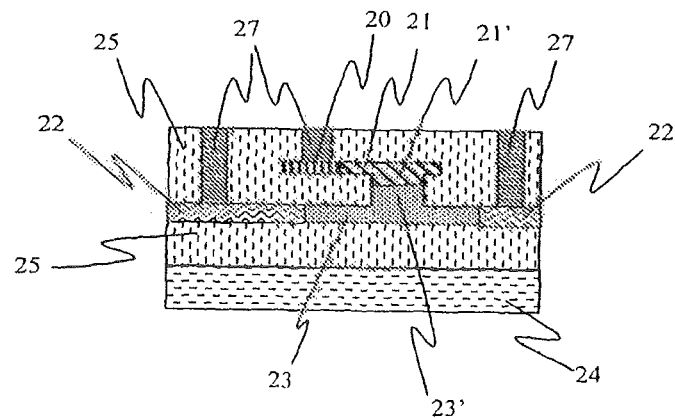
FIG. 1 is a schematic sectional view showing an example of an optical modulator according to a related art.
Figure 2A:
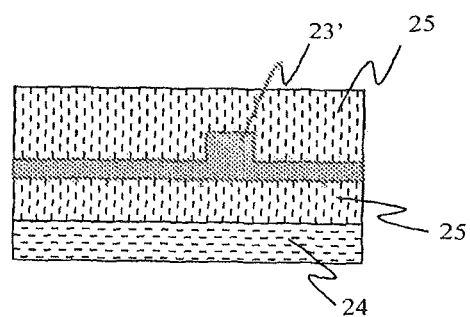
FIG. 2A is a schematic sectional view showing a connecting channel side end of an optical waveguide at position AA' in an example of a connecting channel according to a related art shown in FIG. 3.
Figure 2B:
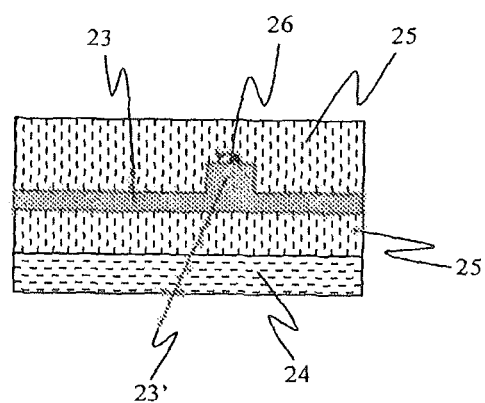
FIG. 2B is a schematic sectional view showing the connecting channel at the position AA' in the example of the connecting channel according to the related art shown in FIG. 3.

Hereinafter, embodiments of the present invention are described with reference to the accompanying drawings. Components having similar functions are denoted by similar reference numerals in the drawings, and description thereof may be omitted.

A connecting channel described below is located between an optical waveguide and an optical modulator that is one of optical devices to connect the optical waveguide and the optical modulator. In reality, the optical waveguide, the connecting channel, and the optical modulator are covered with an oxide layer. However, in the drawing showing the top view, for easier understanding of a change in internal structure, the oxide layer covering such components is omitted.

A connecting channel according to a first embodiment of the present invention is described.

Figure 5A:
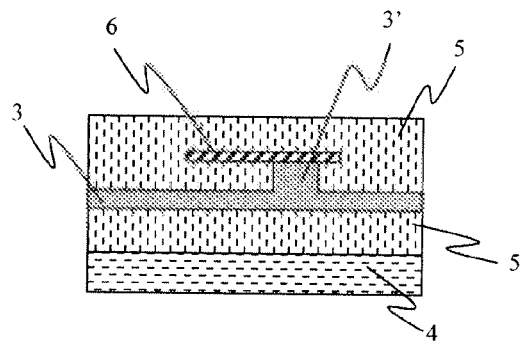
FIG. 5A is a schematic sectional view showing an optical modulator side end of the connecting channel at position BB' in the embodiment of the present invention shown in FIG. 5C.
Figure 5B:
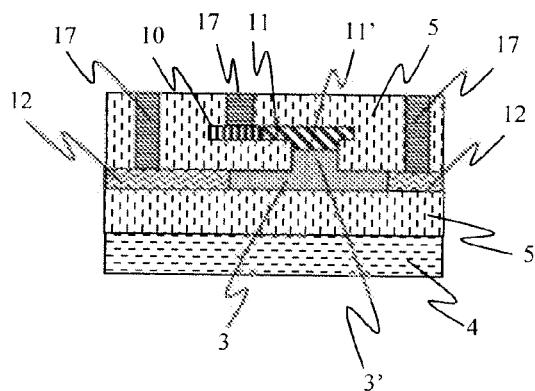
FIG. 5B is a schematic sectional view showing a connecting channel side end of an optical modulator at position BB' in the embodiment of the present invention shown in FIG. 5C.
Figure 5C:
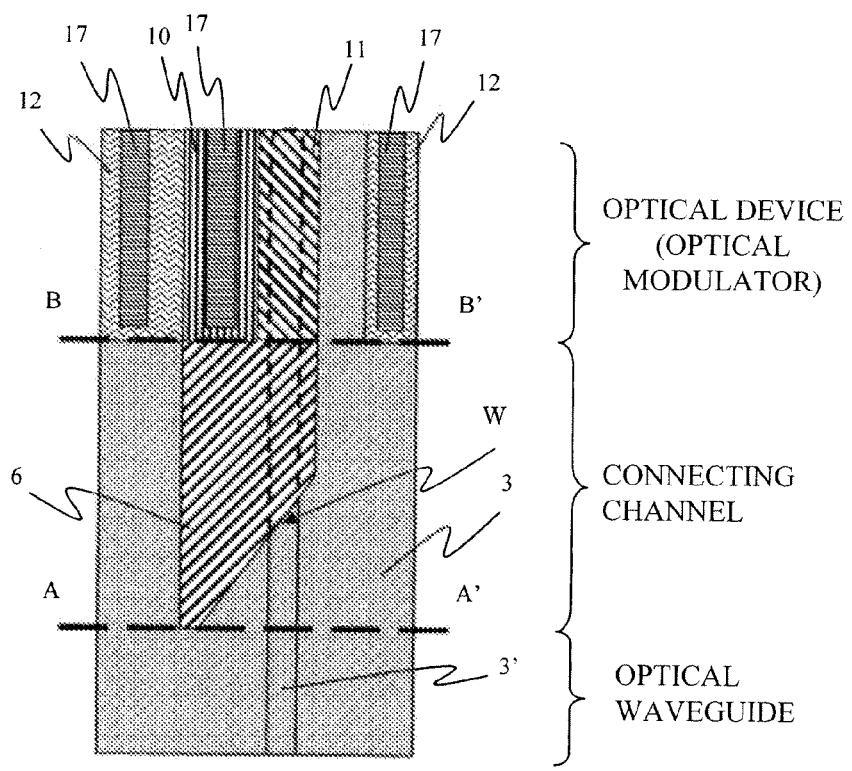
FIG. 5C is a schematic top view showing the connecting channel, the optical waveguide, and the optical waveguide when the connecting channel connects the optical waveguide and the optical modulator in the embodiment of the present invention.

FIGS. 4A to 5C schematically show a connecting channel according to a first embodiment of the present invention: FIG. 4A schematically showing a section of a connecting channel side end of an optical waveguide at position AA' shown in FIG. 5C; FIG. 4B schematically showing a section of an optical waveguide side end of the connecting channel at position AA' shown in FIG. 5C; FIG. 5A schematically showing a section of an optical modulator side end of the connecting channel at position BB' shown in FIG. 5C; FIG. 5B schematically showing a section of a connecting channel side end of an optical modulator at position BB' shown in FIG. 5C; and FIG. 5C schematically showing a top view when the connecting channel connects the optical waveguide and the optical modulator.

In FIG. 5C, the optical waveguide is located below position AA', the connecting channel is located between position AA' and position BB', and the optical modulator is located above position BB'.

As shown in FIG. 4A, the optical waveguide includes a SOI substrate including substrate 4, oxide layer 5, and p-doped silicon layer 3 that has been doped. Rib-shaped part 3' is formed in p-doped silicon layer 3 to serve as a waveguide. The entire optical waveguide is covered with oxide layer 5.

As shown in FIG. 4B, at an optical waveguide side end of the connecting channel, the SOI substrate including substrate 4, oxide layer 5, and first silicon layer 3 (hereinafter, "p-doped silicon layer that has been doped") is formed. As in the case of the optical waveguide, p-doped silicon layer 3 of the SOI substrate has rib-shaped part 3' that serves as a waveguide. Second silicon layer 6 (hereinafter, "polycrystal silicon layer"), which is an upper layer of rib-shaped part 3 and is positioned away from rib-shaped part 3, is formed.

As shown in FIG. 5A, at an optical modulator side end of the connecting channel, as in the case of the optical waveguide side end, a waveguide is formed by rib-shaped part 3' of p-doped silicon layer 3 of the SOI substrate. An upper portion of rib-shaped part 3' is covered with polycrystal silicon layer 6. The entire connecting channel is covered with oxide layer 5.

As shown in FIG. 5B, the optical modulator that is one of optical devices includes a SOI substrate including substrate 4, oxide layer 5, and p-doped silicon layer 3 that has been doped. Rib-shaped part 3' is formed in p-doped silicon layer 3. In both sides of p-doped silicon layer 3, p+ doped silicon layers 12 doped with high concentration are formed. Above rib-shaped part 3', n-doped silicon layer 11 that has been doped is formed. Reverse rib-shaped part 11' is formed in n-doped silicon layer 11. Two rib-shaped parts 3' and 11' constitute a waveguide. In a side portion of n-doped silicon layer 11, n+ doped silicon layer 10 doped with high concentration is formed. Electrodes 17 are connected to p+ doped silicon layer 12 and n+ doped silicon layer 10, and portions other than those to which electrodes 17 are connected are covered with oxide layer 5.

As shown in FIG. 5C, rib-shaped part 3' of p-doped silicon layer 3, namely, the waveguide, is connected between the optical waveguide and the optical modulator via the connecting channel. Rib-shaped part 3' of p-doped silicon layer 3 in the connecting channel, namely, the waveguide, is formed linear to extend in a longitudinal direction of the connecting channel. A width of polycrystal silicon layer 6 at the optical modulator side end of the connecting channel is equal to a total width of n-doped silicon layer 11 and n+ doped silicon layer 10 of the optical modulator. Polycrystal silicon layer 6 is connected to n-doped silicon layer 11 and n+ doped silicon layer 10.

Polycrystal silicon layer 6 of the connecting channel is stacked on p-doped silicon layer 3 to extend in the longitudinal direction of the connecting channel and to partially overlap rib-shaped part 3'. Specifically, polycrystal silicon layer 6 covers rib-shaped part 3' of p-doped silicon layer 3 at the optical modulator side end. Polycrystal silicon layer 6 has linear tapered part W where one side face of polycrystal layer 6 approaches the other side face, in other words, is tapered, as it is closer to the optical waveguide side end. Polycrystal silicon layer 6 changes from a relative position overlapping the upper portion of the rib-shaped part to a relative position not overlapping with respect to rib-shaped part 3' of p-doped silicon layer 3 in the midway (intermediate position) of tapered part W. Thus, at the optical waveguide side end, polycrystal silicon layer 6 is located away from the upper portion of the rib-shaped part of p-doped silicon layer 3. The other side face is linear along a light traveling direction.

With the configuration of the connecting channel where polycrystal silicon layer 6 has tapered part W, polycrystal silicon layer 6 gradually covers the upper portion of rib-shaped part 3' of p-doped silicon layer 3. As described above, when the shape of the waveguide suddenly changes, specifically, when p-doped silicon layer 3 and polycrystal silicon layer 6 are orthogonal to each other at the overlapping start position, the light propagated thorough the waveguide is reflected there to generate light losses. In the related art, the certain broad width of the tapered leading end of the upper Si layer (equivalent to polycrystal layer 6 in the embodiment) causes coupling losses. In the embodiment, however, the tapered leading end of polycrystal silicon layer 6 is located with a gap from the waveguide that includes p-doped silicon layer 3. Generation of light losses can be reduced by gradually changing the shape of the waveguide to prevent p-doped silicon layer 3 and polycrystal silicon layer 6 from being orthogonal to each other at the overlapping start position.

Even when a manufacturing error between polycrystal silicon layer 6 and p-doped silicon layer 3 causes back-and-forth or left-and-right shifting of positions of polycrystal silicon layer 6 and p-doped silicon layer 3 from positions to be arranged, tapered part W of polycrystal silicon layer 6 and rib-shaped part 3' of p-doped silicon layer 3 are sufficiently larger than the manufacturing error. Hence, positional shifting between polycrystal silicon layer 6 and p-doped silicon layer 3 causes no light loss at the connecting channel.

In the abovementioned related art, the small manufacturing tolerance of the connecting channel causes variance on light losses among the connecting channels. However, the connecting channel according to the present invention has extremely high manufacture tolerance, and hence the connecting channel can be easily manufactured. In addition, there is no variance on light losses among the connecting channels, and hence reliability is very high.

A connecting channel according to a second embodiment of the present invention is described. An optical waveguide and an optical modulator are similar in structure to those of the abovementioned embodiment, and thus only the connecting channel is described below.

Figure 6A:
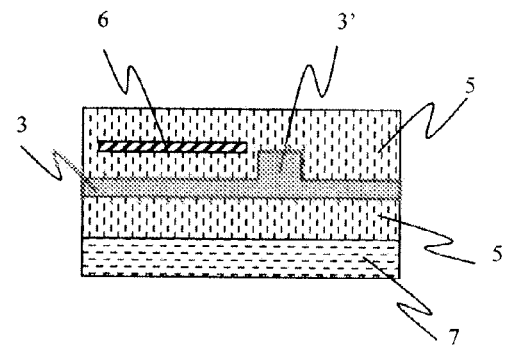
FIG. 6A is a schematic sectional view showing an optical waveguide side end of a connecting channel at position AA' in another embodiment of the present invention shown in FIG. 6C.
Figure 6B:
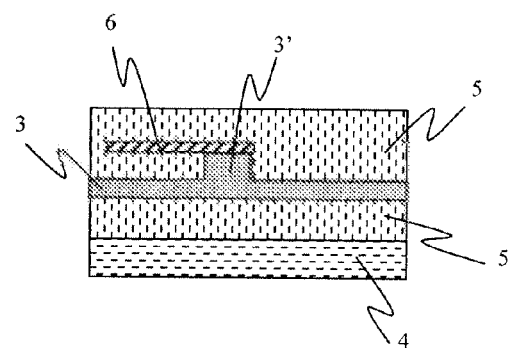
FIG. 6B is a schematic sectional view showing an optical modulator side end of the connecting channel at position BB' in another embodiment of the present invention shown in FIG. 6C.
Figure 6C:
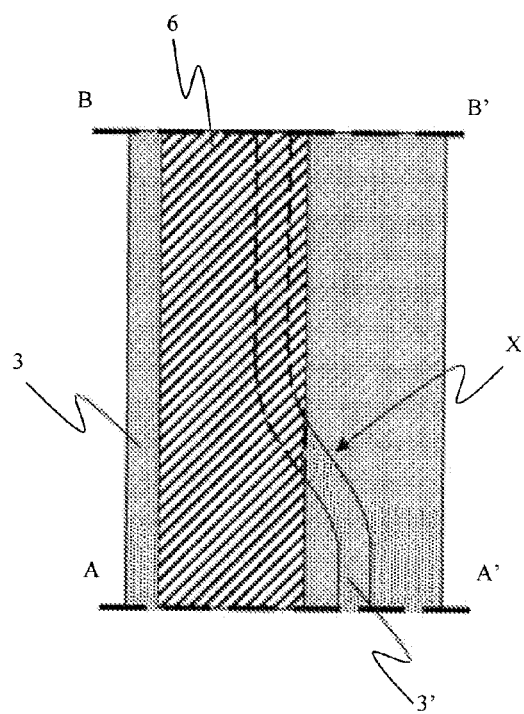
FIG. 6C is a schematic top view showing the connecting channel according to another embodiment of the present invention.

FIGS. 6A to 6C schematically show the connecting channel according to the second embodiment of the present invention: FIG. 6A schematically showing a section of an optical waveguide side end of the connecting channel at position AA' shown in FIG. 6C; FIG. 6B schematically showing a section of an optical modulator side end of the connecting channel at position BB' shown in FIG. 6C; and FIG. 6C schematically showing a top view of the connecting channel.

In reality, as shown in FIG. 6C, an optical waveguide is connected below position AA', and an optical modulator is connected above position BB'. Description of components similar to those of the abovementioned embodiment is omitted.

As shown in FIG. 6A, the optical waveguide side end of the connecting channel includes a SOI substrate including substrate 4, oxide layer 5, and p-doped silicon layer 3 that has been doped. Rib-shaped part 3' is formed in p-doped silicon layer 3 of the SIO substrate to serve as a waveguide. Polycrystal silicon layer 6 is formed in a position with a gap from rib-shaped part 3' and is an upper layer of rib-shaped part 3'.

As shown in FIG. 6B, the optical modulator side end of the connecting channel includes a waveguide formed by rib-shaped part 3' of p-doped silicon layer 3 of a SOI substrate as in the cased of the optical waveguide side end. An upper portion of rib-shaped part 3' is covered with polycrystal silicon layer 6. The entire connecting channel is covered with oxide layer 5.

At the optical waveguide side end and at the optical modulator side end of the connecting channel, polycrystal silicon layers 6 are formed in similar positions. At the optical waveguide side end, rib-shaped part 3' of p-doped silicon layer 3 and polycrystal silicon layer 6 are spaced from each other to prevent overlapping. However, at the optical modulator side end, rib-shaped part 3' is located below polycrystal silicon layer 6 to overlap it, and rib-shaped parts 3' are in different positions between the optical waveguide side end and the optical modulator side end.

As shown in FIG. 6C, polycrystal silicon layer 6 is formed linear from the optical modulator side end to the optical waveguide side end without any change in width. In the embodiment, rib-shaped parts 3' formed in p-doped silicon layers 3 are different in positions between the optical modulator side end and the optical waveguide side end. S-shaped part X is formed between the optical modulator side end and the optical waveguide side end. Polycrystal silicon layer 6 overlaps S-shaped part X of rib-shaped part 3' of p-doped silicon layer 3.

S-shaped part X of rib-shaped part 3' of p-doped silicon layer 3 and a linear side portion of polycrystal silicon layer 6 overlap each other, and hence rib-shaped part 3' and polycrystal silicon layer 6 gradually overlap each other vertically in a light traveling direction. This enables reduction of light losses. Even when a manufacturing error between polycrystal silicon layer 6 and p-doped silicon layer 3 causes positional shifting, it is only necessary for polycrystal silicon layer 6 and p-doped silicon layer 3 to start overlapping at S-shaped part X of the waveguide. S-shaped part X of the waveguide is larger than the positional shifting caused by the manufacturing error, and hence a possibility of increasing light losses by the positional shifting caused by a manufacturing error is small. Thus, the connecting channel always has constant coupling losses without any change of coupling losses by the positional shifting. As a result, the connecting channel of the modulator and the waveguide high in manufacturing tolerance with respect to the positional shifting and high in reliability can be achieved.

A connecting channel according to a third embodiment of the present invention is described. An optical waveguide and an optical modulator are similar in structure to those of the abovementioned embodiment, and thus description thereof is omitted.

Figure 7A:
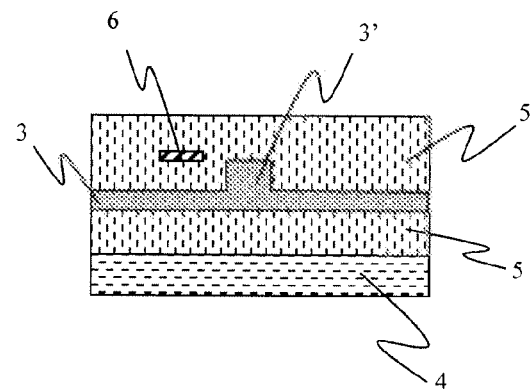
FIG. 7A is a schematic sectional view showing an optical waveguide side end of a connecting channel at position AA' in yet another embodiment of the present invention shown in FIG. 7C.
Figure 7B:
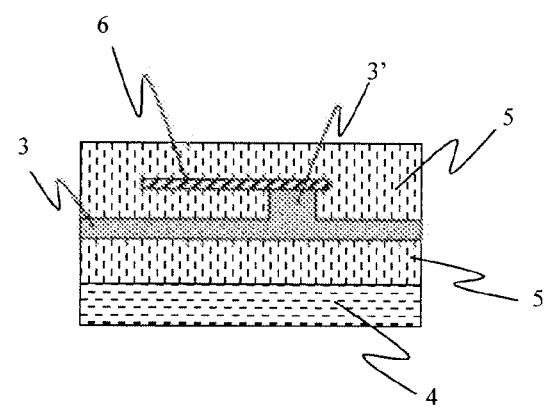
FIG. 7B is a schematic sectional view showing an optical modulator side end of the connecting channel at position BB' in yet another embodiment of the present invention shown in FIG. 7C.
Figure 7C:
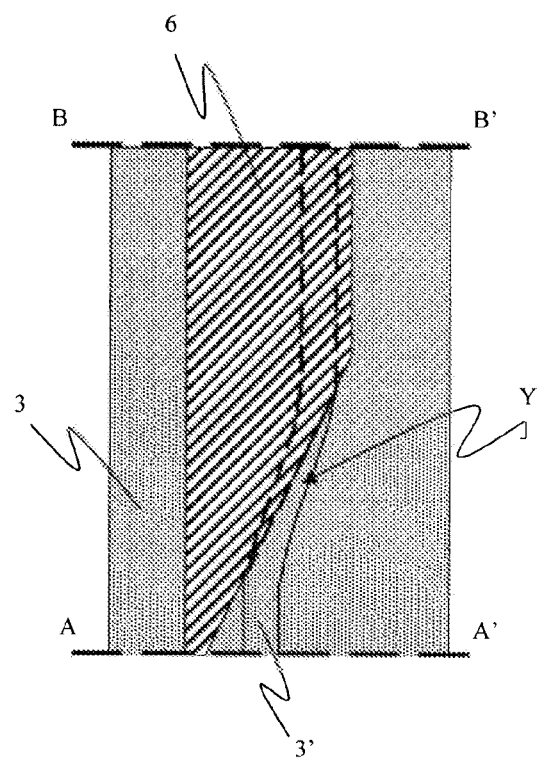
FIG. 7C is a schematic top view showing the connecting channel according to yet another embodiment of the present invention.

FIGS. 7A to 7C schematically show the connecting channel according to the third embodiment of the present invention: FIG. 7A schematically showing a section of an optical waveguide side end of the connecting channel at position AA' shown in FIG. 7C; FIG. 7B schematically showing a section of an optical modulator side end of the connecting channel at position BB' shown in FIG. 7C; and FIG. 7C schematically showing a top view of the connecting channel.

In reality, as shown in FIG. 7C, an optical waveguide is connected below position AA', and an optical modulator is connected above position BB'. Description of components similar to those of the abovementioned embodiment is omitted.

As shown in FIG. 7A, the optical waveguide side end of the connecting channel includes a SOI substrate including substrate 4, oxide layer 5, and p-doped silicon layer 3 that has been doped. Rib-shaped part 3' is formed in p-doped silicon layer 3 of the SOI substrate to serve as a waveguide. Polycrystal silicon layer 6 is formed in a position with a gap from rib-shaped part 3' and is an upper layer of rib-shaped part 3'.

As shown in FIG. 7B, the optical modulator side end of the connecting channel includes a waveguide formed by rib-shaped part 3' of p-doped silicon layer 3 as in the cased of the optical waveguide side end. An upper portion of rib-shaped part 3' is covered with polycrystal silicon layer 6.

At the optical modulator side end as compared with the optical waveguide side end, rib-shaped part 3' of p-dope silicon layer 3 moves away from polycrystal silicon layer 6. A position of a side portion of polycrystal silicon layer 6 away from rib-shaped part 3' of p-doped silicon layer 3 is not changed. However, an end close to rib-shaped part 3' moves to the rib-shaped part side, passes through the upper portion of rib-shaped part 3' of p-doped silicon layer 3, and covers the upper portion of rib-shaped part 3'.

As shown in FIG. 7C, in the connecting channel, rib-shaped part 3' of p-doped silicon layer 3 has a gentle S-shaped part that approaches the side portion of polycrystal silicon layer 6 away from rib-shaped part 3' from the optical modulator side end toward the optical waveguide side end.

Polycrystal silicon layer 6 of the connecting channel covers rib-shaped part 3' of p-doped silicon layer 3 at the optical modulator side end. However, polycrystal silicon layer 6 has linear tapered shape Y where one side face of the polycrystal silicon layer approaches the other side face, in other words, is tapered, as it is closer to the optical waveguide side end. In the embodiment, polycrystal silicon layer 6 moves, at tapered part Y, from a relative position overlapping the upper portion of rib-shaped part 3' to a relative position not overlapping with respect to the gentle S-shaped portion of rib-shaped part 3' of p-doped silicon layer 3. The other side face approaches one side face of polycrystal silicon layer 6.

In the first embodiment, rib-shaped part 3' is linear. However, in the present embodiment, because of the gentle S-shaped part, the distance for crossing rib-shaped part 3' of p-doped silicon layer 3 by polycrystal silicon layer 6 is longer. In other words, the shape of the waveguide changes more gently in the present embodiment than in the first embodiment, and light losses can be reduced more.

The gentle S-shaped part of rib-shaped part 3' of p-doped silicon layer 3 and tapered part Y of polycrystal silicon layer 6 are larger than positional shifting caused by a manufacturing error, and hence the manufacturing error causes no increase of light losses, and coupling losses are constant for the connection channel as in the case of the first embodiment.

Thus, a connecting channel high in manufacturing tolerance and high in reliability can be achieved.

A connecting channel according to a fourth embodiment of the present invention is described. An optical waveguide and an optical modulator are similar in structure to those of the abovementioned embodiment, and thus description thereof is omitted.

Figure 8A:
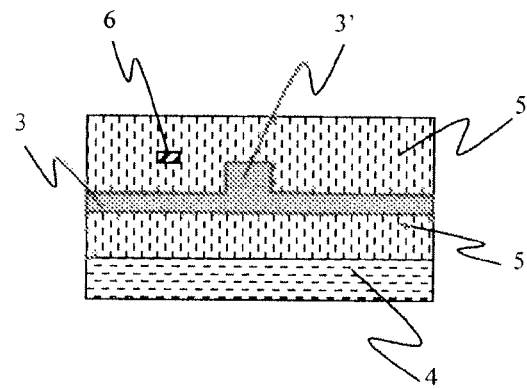
FIG. 8A is a schematic sectional view showing an optical waveguide side end of a connecting channel at position AA' in yet another embodiment of the present invention shown in FIG. 8C.
Figure 8B:
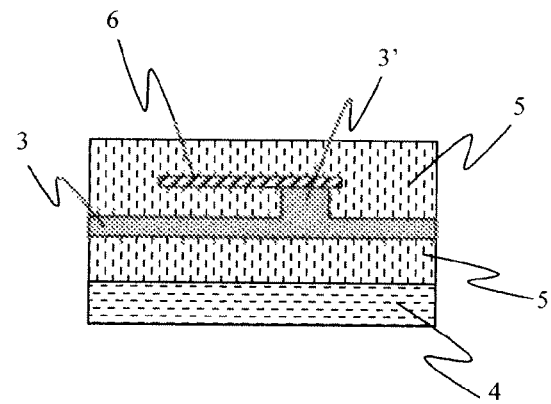
FIG. 8B is a schematic sectional view showing an optical modulator side end of the connecting channel at position BB' in yet another embodiment of the present invention shown in FIG. 8C.
Figure 8C:
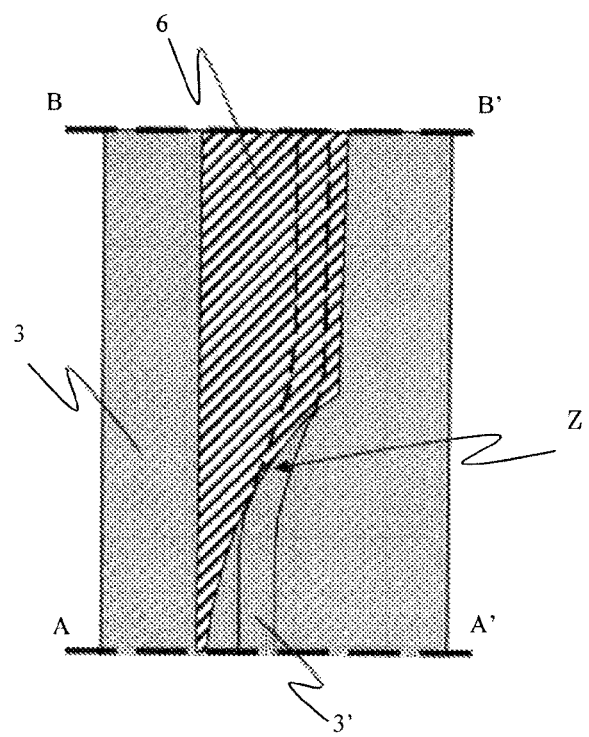
FIG. 8C is a schematic top view showing the connecting channel according to yet another embodiment of the present invention.

FIGS. 8A to 8C schematically show the connecting channel according to the fourth embodiment of the present invention: FIG. 8A schematically showing a section of an optical waveguide side end of the connecting channel at position AA' shown in FIG. 8C; FIG. 8B schematically showing a section of an optical modulator side end of the connecting channel at position BB' shown in FIG. 8C; and FIG. 8C schematically showing a top view of the connecting channel.

In reality, as shown in FIG. 8C, an optical waveguide is connected below position AA', and an optical modulator is connected above position BB'. Description of components similar to those of the abovementioned embodiment is omitted.

As shown in FIGS. 8A and 8B, a structure of the optical waveguide side end and a structure of the optical modulator side end of the connecting channel according to the embodiment are similar to those of the third embodiment (refer to FIG. 7A and FIG. 7B).

As shown in FIG. 8C, as in the case of the third embodiment, in the connecting channel, rib-shaped part 3' of p-doped silicon layer 3 has a gentle S-shaped part that approaches a side portion of polycrystal silicon layer 6 away from rib-shaped part 3' from the optical modulator side end toward the optical waveguide side end.

Polycrystal silicon layer 6 of the connecting channel covers rib-shaped part 3' of p-doped silicon layer 3 at the optical modulator side end. However, polycrystal silicon layer 6 has linear tapered part Z where one side face of polycrystal silicon layer 6 approaches the other side face as it is closer to the optical waveguide side end. In the first and third embodiments, both side faces are linear tapers. However, in the present embodiment, one side face has a curved shape. More specifically, one side face has a curved shape having a large curvature where a width of polycrystal silicon layer 6 is gradually larger from the optical waveguide side toward the optical modulator side. Tapered part Z of polycrystal silicon layer 6 and a curved part of the optical waveguide side of the S-shaped part of rib-shaped part 3' are bent in the same direction, and a curve of tapered part Z of polycrystal silicon layer 6 has a curvature larger than that of the curved part of the optical waveguide side of rib-shaped part 3'. When the curvature of the curve of tapered part Z is smaller than that of the curved part of the optical waveguide side of rib-shaped part 3', overlapping between polycrystal silicon layer 6 and the rib-shaped part becomes difficult, reducing manufacturing tolerance. As described below, a distance from a start of overlapping of polycrystal silicon layer 6 on rib-shaped part 3' to completion of overlapping becomes short, and hence light losses easily occur.

A difference of the present embodiment from the third embodiment is described. It is presumed that polycrystal silicon layer 6 is equal in linear distance from a relative position overlapping an upper portion of rib-shaper part 3' to a relative position not overlapping with respect to rib-shaped part 3' of p-doped silicon layer 3. However, in the present embodiment, the taper of polycrystal silicon layer 6 is curved, and hence polycrystal silicon layer 6 overlaps the upper portion of rib-shaped part 3' over a longer distance. Preferably, the shape of the waveguide is gradually changed. A sudden shape change causes easy light reflection, and light losses easily occur. Thus, light losses can be reduced more when polycrystal silicon layer 6 has a curved taper as in the case of the present invention than when it has a linear taper as in the case of the third embodiment.

Similarly to the abovementioned case, the gentle S-shaped part of rib-shaped part 3' of p-doped silicon layer 3 and tapered part Z of polycrystal silicon layer 6 are larger than positional shifting caused by a manufacturing error, and hence the manufacturing error causes no increase of light losses, and coupling losses are constant for the connecting channel as in the case of the abovementioned embodiment. Thus, the connecting channel high in manufacturing tolerance and high in reliability can be achieved.

Figure 9:
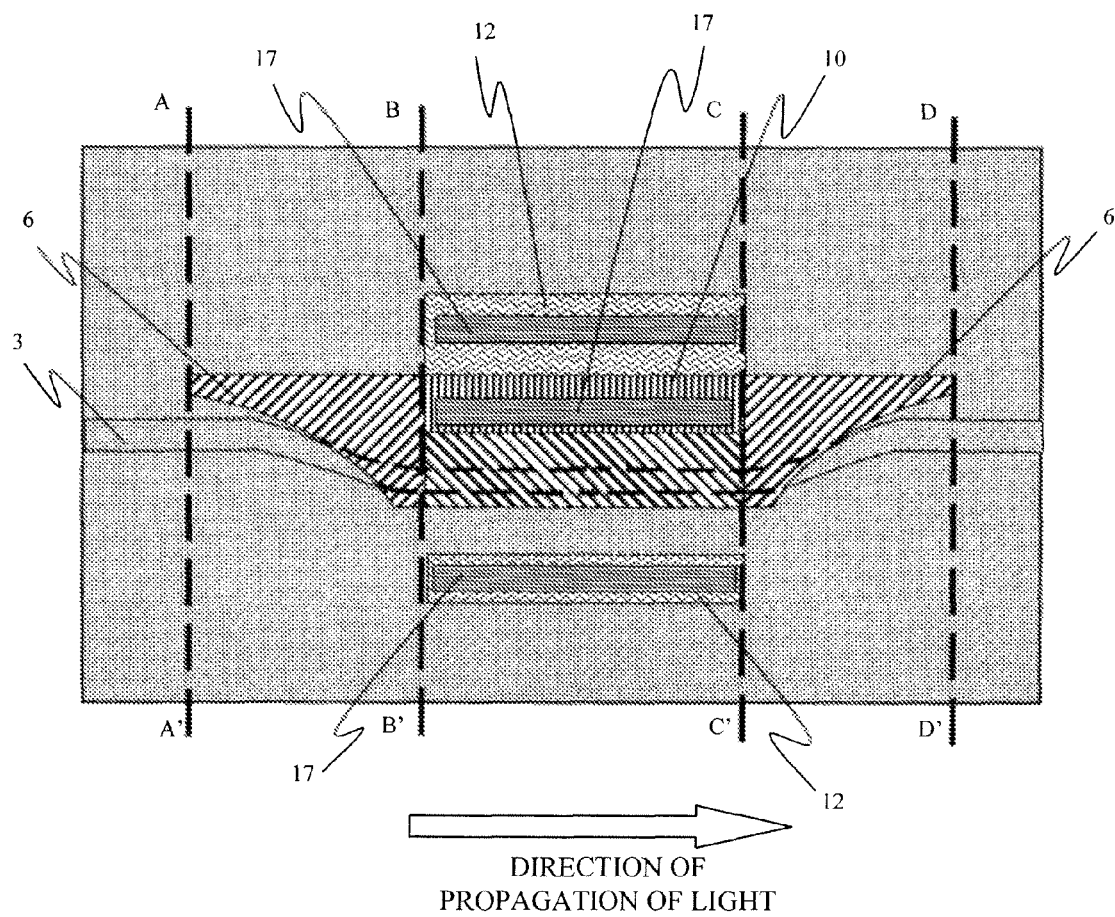
FIG. 9 is a schematic top view showing the connecting channel and an optical modulator when the connecting channel shown in FIGS. 8A to 8C is connected to both input and output sides of the optical modulator.

FIG. 9 schematically shows a top view when connecting channels are arranged in both of input and output sides of an optical modulator that is one of optical devices. For the connecting channel, the connecting channel according to the fourth embodiment is used. The connecting channels are located between position AA' and a position BB' and between position CC' and position DD', and the optical modulator is located between the position BB' and position CC'. An optical waveguide and the optical modulator are similar in structure to those of the abovementioned embodiment, and thus description thereof is omitted.

It is presumed that light travels in an arrow direction (left to right as shown). In other words, BB' side of the optical modulator is an input side while CC' side is an output side.

The connecting channels are arranged to be line-symmetrical between the input side and the output side of light sandwiching the optical modulator. This configuration can achieve a connection structure having manufacturing tolerances at both input and output ends with respect to positional shifting on a horizontal plane between rib-shaped part 3' of p-doped silicon layer 3 and polycrystal silicon layer 6 (vertical or horizontal positional shifting shown in FIG. 9) caused by a manufacturing error in any one of the connecting channels of the input and output sides. Needless to say, as described above, this structure is limited in coupling losses and high in reliability.

Figure 10:
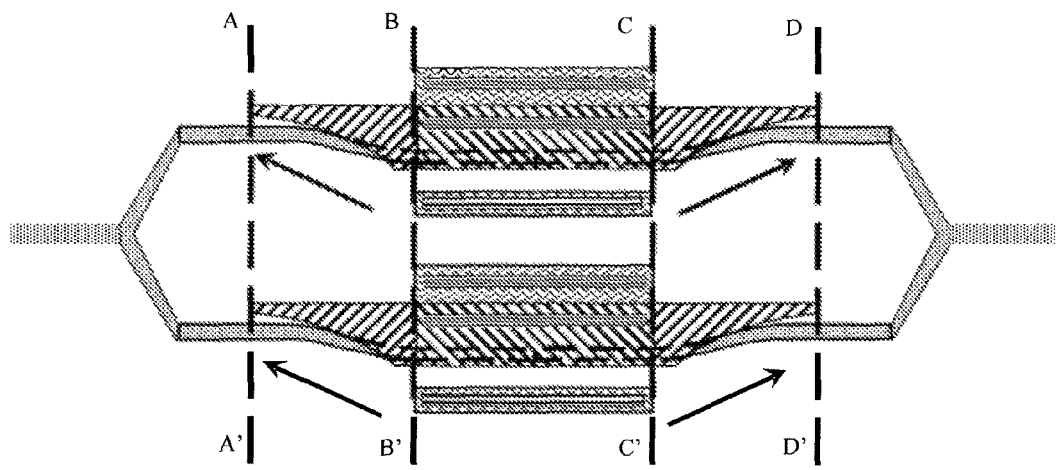
FIG. 10 is a schematic view showing an optical intensity modulator of a Mach-Zehnder interferometer type that uses the connecting channel shown in FIGS. 8A to 8C.

FIG. 10 schematically shows an optical intensity modulator of a Mach-Zehnder interferometer type that uses the connecting channel according to the fourth embodiment. An optical intensity modulation signal can be acquired by using a Mach-Zehnder interferometer to interfere with an optical phase difference at two arms of the Mach-Zehnder interferometer.

Connecting channels are located between position AA' and position BB' and between position CC' and position DD', and an optical modulator is located between position BB' and position CC'. An optical waveguide and the optical modulator are similar in structure to those of the abovementioned embodiment, and thus description thereof is omitted.

A black arrow shown indicates a direction of a curved taper. In other words, the connecting channels are arranged to be line-symmetrical between the input side and the output side sandwiching the optical modulator. The two arms are not symmetrical, but are arranged in parallel with similar configurations.

For the same reason as that described above, this configuration can achieve a connection structure having manufacturing tolerances at both input and output ends with respect to positional shifting on a horizontal plane between rib-shaped part 3' of p-doped silicon layer 3 and polycrystal silicon layer 6 (vertical or horizontal positional shifting shown in FIG. 10) caused by a manufacturing error. Needless to say, as described above, this structure is limited in coupling losses and high in reliability.

As described above, according to the present invention, different from the case of the related art, the tapered leading end is not located in the portion where polycrystal silicon layer 6 passes on rib-shaped part 3' (waveguide) of p-doped silicon layer 3. This prevents light scattering caused by the presence of the tapered leading end. Positional shifting due to the manufacturing errors causes no light loss, and hence light losses are reduced. The positional shifting due to the manufacturing errors causes no increase/decrease of light losses, and hence a highly reliable connecting channel can be achieved. Simultaneously, an optical communication system that uses a waveguide, a connecting channel, and an optical device high in reliability and limited in light losses can be achieved.

This application claims priority from Japanese Patent Application No. 2009-143417 filed Jun. 16, 2009, which is hereby incorporated by reference herein in its entirety.

EXPLANATION OF REFERENCE NUMERALS 3 p-doped silicon layer (first silicon layer)
3' rib-shaped part (waveguide) of p-doped silicon layer
4 substrate
5 oxide layer
6 polycrystal silicon layer (second silicon layer)
10 n+ doped silicon layer
11 n-doped silicon layer
11' rib-shaped part (waveguide) of n-doped silicon layer
12 p+ doped silicon layer
17 electrode
20 n+ doped silicon layer
21 n-doped silicon layer
21' rib-shaped part (waveguide) of n-doped silicon layer
22 p+ doped silicon layer
23 p-doped silicon layer
23' rib-shaped part (waveguide) of p-doped silicon layer
25 oxide layer
27 electrode
W, Y, Z tapered part
X' S-shaped part

The invention claimed is:

1. A connecting channel located between an optical waveguide and an optical device to connect the optical waveguide and the optical device, comprising:
a first silicon layer that has a rib-shaped part extending in a longitudinal direction of the connecting channel; and
a second silicon layer that is stacked on the first silicon layer to partially overlap the rib-shaped part, and extends in the longitudinal direction, the second silicon layer having a tapered part tapered toward one end in the longitudinal direction, and being located away from an upper portion of the rib-shaped part at an end surface of one end in the longitudinal direction,
wherein the rib-shaped part of the first silicon layer includes an S-shaped part, and the S-shaped part intersects a side face of the tapered part of the second silicon layer,
wherein the tapered part of the second silicon layer has a curved shape bent in the same direction as that of a bent part of the other end side, from among two bent parts of the S-shaped part of the first silicon layer, and the tapered part of the second silicon layer has a curvature larger than that of the bent part of the other end side of the first silicon layer.

2. The connecting channel according to claim 1, wherein the second silicon layer has moved, at an intermediate position of the tapered part, from a relative position overlapping the upper portion of the rib-shape part to a relative position not overlapping the same with respect to the rib-shaped part of the first silicon layer.

3. The connecting channel according to claim 2, wherein the rib-shaped part of the first silicon layer is linear.

4. The connecting channel according to claim 2, wherein a side face of the tapered part of the second silicon layer intersecting at least the rib-shaped part is curved.

5. The connecting channel according to claim 1, wherein the rib-shaped part of the first silicon layer is linear.

6. The connecting channel according to claim 1, wherein a side face of the tapered part of the second silicon layer intersecting at least the rib-shaped part is curved.

7. An optical communication system having an optical waveguide and an optical device connected by the connecting channel according to claim 1.

8. A connecting channel located between an optical waveguide and an optical device to connect the optical waveguide and the optical device, comprising:
a first silicon layer that has a rib-shaped part extending in a longitudinal direction of the connecting channel; and
a second silicon layer that is located on the first silicon layer, that does not overlap the first silicon layer at one end in the longitudinal direction of the connecting channel, that overlaps the first silicon layer at the other end in the longitudinal direction, and that is not orthogonal to the first silicon layer at an overlapping starting position with the first silicon layers,
wherein the rib-shaped part of the first silicon layer includes an S-shaped part, and the S-shaped part intersects a side face of the tapered part of the second silicon layer,
wherein the tapered part of the second silicon layer has a curved shape bent in the same direction as that of a bent part of the other end side, from among two bent parts of the S-shaped part of the first silicon layer, and the tapered part of the second silicon layer has a curvature larger than that of the bent part of the other end side of the first silicon layer.

9. The connecting channel according to claim 8, wherein the rib-shaped part of the first silicon layer includes an S-shaped part, and the first silicon layer starts to overlap the second silicon layer at the S-shaped part.

10. A method for manufacturing a connecting channel located between an optical waveguide and an optical device to connect the optical waveguide and the optical device, comprising:
stacking a second silicon layer on a first silicon layer that has a rib-shaped part formed to extend in a longitudinal direction of the connecting channel to partially overlap the rib-shaped part and to extend in the longitudinal direction, forming a tapered part tapered toward one end in the longitudinal direction in a second silicon layer, and locating the second silicon layer away from an upper portion of the rib-shaped part at an end surface of one end in the longitudinal direction,
wherein an S-shaped part is formed in the rib-shaped part of the first silicon layer, and the S-shaped part of the first silicon layer and the tapered part of the second silicon layer partially overlap each other,
wherein the tapered part of the second silicon layer is bent in the same direction as that of a bent cart of the other end side from among two bent parts of the S-shared art of the first silicon layer, and is bent at a curvature larger than that of the bent part of the other end side of the first silicon layer.

11. The method for manufacturing a connecting channel according to claim 10, wherein the tapered part of the second silicon layer is partially located above the rib-shaped part of the first silicon layer.

12. The method for manufacturing a connecting channel according to claim 10, wherein the rib-shaped part of the first silicon layer is formed so that the rib-shaped part is linear.

13. The method for manufacturing a connecting channel according to claim 10, wherein a side face of the tapered part of the second silicon layer intersecting at least the rib-shaped part is formed so that the shape of the side face is curved.

14. A method for manufacturing an optical communication system, comprising:
    integrally forming a connecting channel manufactured by the method for manufacturing the connecting channel according to claim 10, an optical device, and an optical waveguide.

\* \* \* \* \*